(12) United States Patent
Zhang et al.

(10) Patent No.: US 10,682,975 B2
(45) Date of Patent: Jun. 16, 2020

(54) VEHICLE INTERIOR COMPONENT

(71) Applicant: Shanghai Yanfeng Jinqiao Automotive Trim Systems Co. Ltd., Novi, MI (US)

(72) Inventors: Fanglin Zhang, Shanghai (CN); Leilei Wang, Shanghai (CN); Jie Sun, Shanghai (CN); Yuwen Luo, Shanghai (CN)

(73) Assignee: Shanghai Yanfeng Jingqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 16/259,199

(22) Filed: Jan. 28, 2019

(65) Prior Publication Data

US 2019/0193662 A1    Jun. 27, 2019

Related U.S. Application Data

(63) Continuation of application No. PCT/CN2017/094880, filed on Jul. 28, 2017.

(30) Foreign Application Priority Data

Jul. 29, 2016    (CN) .......................... 2016 2 0815431

(51) Int. Cl.
*B60R 21/215*    (2011.01)
*B32B 27/00*    (2006.01)
(Continued)

(52) U.S. Cl.
CPC ............ *B60R 21/215* (2013.01); *B29C 41/18* (2013.01); *B29C 41/22* (2013.01); *B32B 27/00* (2013.01);
(Continued)

(58) Field of Classification Search
CPC .... B60R 21/215; B60R 21/2165; B32B 27/08
See application file for complete search history.

(56) References Cited

U.S. PATENT DOCUMENTS 5,564,731 A      10/1996   Gallagher et al.
5,590,901 A  *   1/1997    MacGregor ......... B60R 21/2165
                                                     280/728.3
(Continued)

FOREIGN PATENT DOCUMENTS

CN            1153722 A        7/1997
CN          102951112 A        3/2013
(Continued)

OTHER PUBLICATIONS

International Search Report from the International Searching Authority for International Patent Application No. PCT/CN2017/094880 dated Sep. 18, 2017 (English translation) (3 pages).

*Primary Examiner* — Faye M Fleming

(57) ABSTRACT

A trim component for a vehicle interior is disclosed. The trim component may provide an opening for airbag deployment and may comprise a substrate; a foam layer and a cover comprising a support layer coupled to a skin layer. The support layer may comprise at least one of polyurethane coating; two-component reactive aliphatic polyurethane; two-component reactive aromatic polyurethane; polyurea; acrylic elastomer; aromatic TPU; aliphatic TPU; TPO. The support layer may comprise a polyurethane coating. The polyurethane coating may be sprayed on the skin layer. The polyurethane coating may comprise a waterborne polyurethane. A thickness of the support layer may be generally less than a thickness of the skin layer. The trim component may comprise first and second features to facilitate deployment of the airbag through the opening. The support layer may
(Continued)

limit fragmentation/separation of the skin layer during airbag deployment. The trim component may comprise an instrument panel.

20 Claims, 1 Drawing Sheet

(51) Int. Cl.
B29C 41/18 (2006.01)
B29C 41/22 (2006.01)
B32B 27/06 (2006.01)
B32B 27/30 (2006.01)
B32B 27/40 (2006.01)
B60R 21/205 (2011.01)
B29L 31/30 (2006.01)

(52) U.S. Cl.
CPC .......... B32B 27/065 (2013.01); B32B 27/304 (2013.01); B32B 27/40 (2013.01); B60R 21/205 (2013.01); B29L 2031/3008 (2013.01); B29L 2031/3038 (2013.01)

(56) References Cited

U.S. PATENT DOCUMENTS

| 5,698,283 | A | * | 12/1997 | Yamasaki | B29C 51/14 |
| | | | | | 280/728.3 |
| 5,863,064 | A | | 1/1999 | Rheinlander et al. | |
| 6,460,880 | B1 | | 10/2002 | Gallagher et al. | |
| 7,478,827 | B2 | * | 1/2009 | Thomas | B32B 5/18 |
| | | | | | 280/728.3 |
| 7,560,515 | B2 | | 7/2009 | Tansey | |
| 7,810,836 | B2 | * | 10/2010 | Muller | B60R 21/2165 |
| | | | | | 280/728.2 |
| 8,101,111 | B2 | | 1/2012 | Decher et al. | |
| 8,771,580 | B2 | | 7/2014 | Walter et al. | |
| 8,807,590 | B2 | | 8/2014 | Wisniewski et al. | |
| 8,985,621 | B2 | * | 3/2015 | Scharf | B32B 7/00 |
| | | | | | 280/728.3 |
| 9,481,338 | B2 | * | 11/2016 | Mazur | B29C 44/06 |
| 9,623,827 | B2 | * | 4/2017 | Fischer | B60R 21/2165 |
| 2005/0037205 | A1 | | 2/2005 | Dalzotto et al. | |
| 2005/0112357 | A1 | * | 5/2005 | Williams, II | B29C 44/145 |
| | | | | | 428/319.3 |
| 2007/0018435 | A1 | | 1/2007 | Muller et al. | |
| 2010/0151227 | A1 | * | 6/2010 | Donatti | B29C 44/08 |
| | | | | | 428/319.3 |
| 2011/0028625 | A1 | | 2/2011 | Tansey | |
| 2016/0137154 | A1 | | 5/2016 | Sasu et al. | |
| 2018/0304599 | A1 | * | 10/2018 | Smith | B32B 27/22 |

FOREIGN PATENT DOCUMENTS

| CN | 103448183 B | 8/2015 |
| DE | 102008003153 A1 | 7/2009 |
| EP | 1004418 A2 | 5/2000 |
| JP | 2006082791 A | 3/2006 |
| JP | 2013047087 A | 3/2013 |
| KR | 101062299 B1 | 8/2011 |

* cited by examiner

VEHICLE INTERIOR COMPONENT

CROSS-REFERENCE TO RELATED APPLICATIONS

The present application is a continuation of PCT/International Patent Application No. PCT/CN2017/094880 titled "AIRBAG DOOR COVER FOR VEHICLE" filed Jul. 28, 2017, which claims the benefit of Chinese Patent Application No. 201620815431.8 filed Jul. 29, 2016 (now Chinese Utility Model No. CN205930619U).

The present application claims priority to and incorporates by reference in full the following patent application(s): (a) Chinese Patent Application No. 201620815431.8 filed Jul. 29, 2016 (now Chinese Utility Model No. CN205930619U); (b) International/PCT Patent Application No. PCT/CN2017/094880 titled "AIRBAG DOOR COVER FOR VEHICLE" filed Jul. 28, 2017.

FIELD

The present invention relates to a vehicle interior component.

The present invention also relates to a trim component for a vehicle interior configured to provide an opening for deployment of an airbag from a chute through the opening.

BACKGROUND

It is known to provide a trim component for a vehicle interior configured to provide an opening for deployment of an airbag from a chute through the opening.

The interior environment of the automobile is directly related to feelings of the driver and passengers, and for the interior, emphases are laid on the sense of touch, the hand feeling, the comfort, the ornamental value, etc. A semi-rigid foam flexible instrument panel may comprise polyurethane foam filled between a skin and a substrate, which may improve the sense of touch, and also bring about a comfortable and luxurious feeling. Such an instrument panel may absorb energy, so it is mostly used in the medium-and-high grade automobiles. As people have increasingly higher requirements for the appearances, functions and safety of the automotive interior parts, the demand for the airbag type instrument panel increases, and instrument panels are designed as seamless airbag instrument panels which have no visible attachment line and can ensure the deployment of an airbag. An airbag tearing line may be made in an airbag region on the reverse side of an instrument panel to ensure that the airbag can deploy from the instrument panel.

Skin material of an automobile instrument panel may be brittle at a low temperature, and mechanical performance may also be degraded after long-term aging. Due to these factors, during low-temperature airbag deployment, the skin and foam of a seamless airbag instrument panel may be broken and separate. It would be advantageous to continuously improve low temperature performance of an airbag door cover panel/plate for an automobile.

It is known to introduce a formula of slush-molding skin powder and a manufacturing method. It is known to add a modified plasticizer such as linear trimellitate, modified adipate, heat stabilizer, light stabilizer, etc. into a PVC suspension resin, and blend them in a high-speed blending device to obtain a formula of modified slush-molded powder. The glass transition temperature can be decreased to −50 deg C., the mechanical properties may remain suitable after a long-term aging test, and there may be no debris after low temperature airbag deployment. The process may be complex, and a special blending device may be needed besides the conventional automobile interior product molding process, which may increase the product cost.

It is known to introduce a formula of slush-molding skin powder and a manufacturing method. It is known to add a partially crosslinked polyolefin elastomer into the slush-molding powder. The glass transition temperature can be decreased to −60 deg C., the mechanical properties may remain suitable after a long-term aging test, and there may be no debris after low temperature airbag deployment. The process may be complex, and a special blending device may be needed besides the conventional automobile interior product molding process, which may increase the product cost.

Conventional airbag door cover panels/plates for automobiles may have poor low temperature performances, and in order to improve low temperature performance, the raw material may be modified, which may increase equipment investment, and lengthen the production cycle.

It would be advantageous to provide an improved vehicle interior component. It would also be advantageous to provide a trim component for a vehicle interior configured to provide improved performance in low temperature airbag deployments.

SUMMARY

The present invention relates to a trim component for a vehicle interior configured to provide an opening for deployment of an airbag from a chute through the opening comprising a substrate; a cover comprising a skin layer and a support layer coupled to the skin layer; and a foam layer between the cover and the substrate. The support layer may comprise at least one of (a) a polyurethane coating; (b) two-component reactive aliphatic polyurethane; (c) two-component reactive aromatic polyurethane; (d) polyurea; (e) acrylic elastomer; (f) aromatic thermoplastic polyurethane (TPU); (g) aliphatic thermoplastic polyurethane (TPU); (h) thermoplastic polyolefin (TPO). The support layer may comprise a polyurethane coating. The polyurethane coating may be sprayed on the skin layer. The polyurethane coating may comprise a waterborne polyurethane. The skin layer may comprise a thickness; the support layer may comprise a thickness; the thickness of the support layer may be generally less than the thickness of the skin layer. The trim component may comprise a first feature and a second feature; the first feature and the second feature may be configured to facilitate deployment of the airbag through the opening by facilitating formation of the opening through the foam layer, the support layer and the skin layer; the first feature may comprise a notch in the substrate; the second feature may comprise a notch in the skin layer and an aperture in the support layer aligned with the notch in the skin layer. The foam layer may be provided without a localized area of reduced thickness. The support layer may be configured to at least partially limit deformation of the skin layer when force is applied to the cover; deformation may comprise at least one of (a) stretching; (b) elongating. The skin layer may be molded from at least one of (a) a slush-molding powder; (b) polyvinyl chloride; (c) thermoplastic polyurethane (TPU); (d) thermoplastic polyolefin (TPO).

The present invention relates to a trim component for a vehicle interior configured to provide an opening for deployment of an airbag from a chute through the opening prepared by a process comprising the steps of: providing a skin layer;

applying a support layer to the skin layer to form a cover; providing a foam layer; providing a substrate; and assembling the cover, the foam layer and the substrate. Applying a support layer to the skin layer may comprise spraying a polyurethane coating on the skin layer. The process may further comprise the step of forming a feature in the cover; the feature may comprise a notch in the skin layer and an aperture in the support layer aligned with the notch in the skin layer. The support layer may comprise at least one of (a) two-component reactive aliphatic polyurethane; (b) two-component reactive aromatic polyurethane; (c) polyurea; (d) acrylic elastomer; (e) aromatic thermoplastic polyurethane (TPU); (f) aliphatic thermoplastic polyurethane (TPU); (g) thermoplastic polyolefin (TPO). Providing a skin layer may comprise slush molding a skin layer from at least one of (a) a slush-molding powder; (b) polyvinyl chloride (PVC); (c) thermoplastic polyurethane (TPU); (d) thermoplastic polyolefin (TPO).

The present invention relates to a process for producing a trim component for a vehicle interior configured to provide an opening for deployment of an airbag from a chute through the opening comprising the steps of: providing a skin layer; applying a support layer to the skin layer to form a cover; providing a foam layer; providing a substrate; and assembling the cover, the foam layer and the substrate. Applying a support layer to the skin layer may comprise spraying a polyurethane coating on the skin layer. The process may further comprise a step of forming a feature in the cover; the feature may comprise a notch in the skin layer and an aperture in the support layer aligned with the notch in the skin layer. The support layer may comprise at least one of (a) two-component reactive aliphatic polyurethane; (b) two-component reactive aromatic polyurethane; (c) polyurea; (d) acrylic elastomer; (e) aromatic thermoplastic polyurethane (TPU); (f) aliphatic thermoplastic polyurethane (TPU); (g) thermoplastic polyolefin (TPO). Providing a skin layer may comprise slush molding a skin layer from at least one of (a) a slush-molding powder; (b) polyvinyl chloride (PVC); (c) thermoplastic polyurethane; (d) thermoplastic polyolefin (TPO).

The present invention relates to an airbag door cover plate for an automobile comprising an instrument panel substrate layer, a foam layer, and an instrument panel skin layer which are sequentially arranged. The airbag door cover plate may further comprise a comprise a reinforcing layer on the instrument panel skin layer and located between the foam layer and the instrument panel skin layer; the instrument panel skin layer and the reinforcing layer may comprise a skin weakening line which runs through the entire thickness of the reinforcing layer and a part of thickness of the instrument panel skin layer. The instrument panel substrate layer may comprise a polypropylene composite material. The foam layer may comprise polyurethane foam obtained by a reaction between isocyanate and polyether polyol. The reinforcing layer may comprise any one or combinations of waterborne polyurethane, two-component reactive aliphatic polyurethane, two-component reactive aromatic polyurethane, polyurea, acrylic elastomer, aromatic thermoplastic polyurethane (TPU), aliphatic TPU, thermoplastic polyolefin (TPO). The reinforcing layer may comprise waterborne polyurethane modified by a cellulose viscosifier. The instrument panel skin layer may be molded with slush-molding powder selected from one of polyvinyl chloride, thermoplastic polyurethane elastomer, thermoplastic polyolefin elastomer. The skin weakening line may be a weakening line obtained by weakening after the reinforcing layer is formed on the instrument panel skin layer. The skin weakening line may further extend through entire thicknesses of the substrate layer and the foam layer. The skin weakening line may be obtained by weakening after the reinforcing layer, the instrument panel skin layer, the foam layer and the substrate layer are joined.

FIGURES

DESCRIPTION

Figure 1:
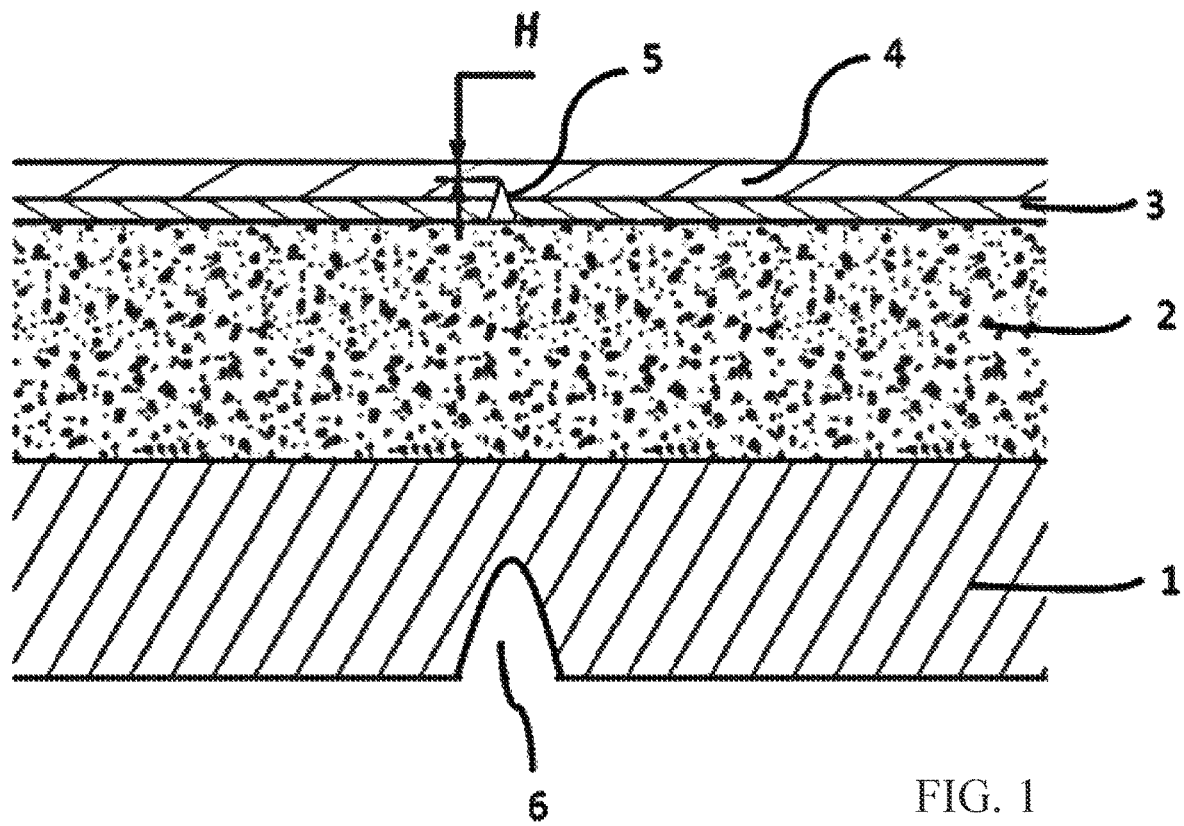
FIG. 1 is a schematic partial section view of a vehicle interior component according to an exemplary embodiment.
Figure 2:
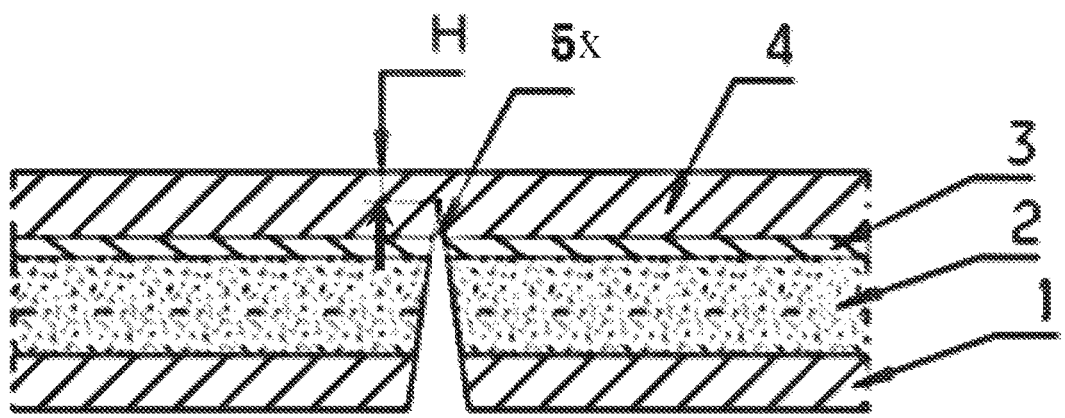
FIG. 2 is a schematic partial section view of a vehicle interior component according to an exemplary embodiment.

According to an exemplary embodiment as shown schematically in FIGS. 1 and 2, a vehicle interior component such as a trim component for a vehicle interior configured to provide an opening for deployment of an airbag from a chute through the opening configured as an airbag door cover (e.g. plate/panel).

According to an exemplary embodiment as shown schematically in FIG. 1, an airbag door cover panel/plate may comprise: an instrument panel substrate 1, a foam layer 2, a reinforcing layer 3, and an instrument panel skin layer 4 which are arranged from bottom to top, wherein the reinforcing layer 3 is on the instrument panel skin layer 4; the instrument panel skin layer 4 and the reinforcing layer 3 may comprise a skin weakening line 5 which runs through the thickness of the reinforcing layer 3 and a part of a thickness of the instrument panel skin layer 4. Instrument panel substrate 1 may comprise a substrate weakening line 6. A distance from a top of the skin weakening line 5 to a skin surface of the instrument panel skin layer 4 may comprise a weakening line residual thickness, as indicated by H in FIG. 1.

According to an exemplary embodiment, the skin weakening line 5 is obtained by weakening (e.g. cold knife weakening) after the reinforcing layer 3 and the instrument panel skin layer 4 are joined.

According to an exemplary embodiment as shown schematically in FIG. 2, an airbag door cover panel/plate may comprise an instrument panel substrate 1, a foam layer 2, a reinforcing layer 3, and an instrument panel skin layer 4 which are arranged from bottom to top; reinforcing layer 3 is on the instrument panel skin layer 4; the panel may further comprise a skin weakening line 5x which runs through the thicknesses of the instrument panel substrate 1, the foam layer 2 and the reinforcing layer 3, and a part of thickness of the instrument panel skin layer 4. A distance from a top of the skin weakening line 5x to a skin surface of the instrument panel skin layer 4 may comprise a weakening line residual thickness, as indicated by H in FIG. 2.

According to an exemplary embodiment, the skin weakening line 5x is obtained by weakening (e.g. laser weakening or hot knife weakening) after the reinforcing layer 3, the instrument panel skin layer 4 and the foam layer 2 are joined.

According to an exemplary embodiment, the instrument panel substrate 1 may comprise a polypropylene composite material.

According to an exemplary embodiment, the foam layer 2 may comprise polyurethane foam obtained by a reaction between isocyanate and polyether polyol.

According to an exemplary embodiment, the reinforcing layer 3 may comprise any one or combinations of waterborne polyurethane, two-component reactive aliphatic polyurethane, two-component reactive aromatic polyurethane, polyurea, acrylic elastomer, aromatic thermoplastic polyurethane (TPU), aliphatic thermoplastic polyurethane (TPU) and thermoplastic polyolefin (TPO).

The instrument panel skin layer 4 may be sprayed with the material of the reinforcing layer 3 and the panel having the sprayed instrument panel skin layer 4 may be tested, respectively, to demonstrate that the material of the reinforcing layer 3 can meet the requirement that there is no debris separated during the deployment of an airbag through the airbag door, as compared with other polyurethane materials (such as a solvent-based polyurethane coating).

Example 1—Waterborne Polyurethane

A waterborne polyurethane was sprayed on a non-appearance surface of a PVC slush-molded skin, and the PVC slush-molded skin with the waterborne polyurethane coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 70,909 joules was recorded, and a skin state after the impact was observed to find that no debris was generated.

A PVC slush-molded skin sprayed with the waterborne polyurethane coating was connected to an instrument panel substrate by a foaming and weakening process to manufacture an instrument panel assembly; the instrument panel assembly was loaded onto an automobile to perform an airbag deployment test at −35 deg C.; there was no skin debris after airbag deployment.

Low temperature performance of a PVC slush-molded skin can be effectively enhanced by a waterborne polyurethane coating, and the development requirement of the panel having such PVC slush-molded skin can be satisfied.

Example 2—Two-Component Reactive Aliphatic Polyurethane

A two-component reactive aliphatic polyurethane was sprayed on a non-appearance surface of a PVC slush-molded skin, and the PVC slush-molded skin with the two-component reactive aliphatic polyurethane coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 79,814 joules was recorded, and a skin state after the impact was observed to find that no debris was generated.

A PVC slush-molded skin sprayed with the two-component reactive aliphatic polyurethane coating was connected to an instrument panel substrate by a foaming and weakening process to manufacture an instrument panel assembly; the instrument panel assembly was loaded onto an automobile to perform an airbag deployment test at −35 deg C.; there was no skin debris after airbag deployment.

Low temperature performance of a PVC slush-molded skin can be effectively enhanced by a two-component reactive aliphatic polyurethane coating, and the development requirement of the panel having such PVC slush-molded skin can be satisfied.

Example 3—Two-Component Reactive Aromatic Polyurethane

A two-component reactive aromatic polyurethane was sprayed on a non-appearance surface of a PVC slush-molded skin, and the PVC slush-molded skin with the two-component reactive aromatic polyurethane coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 79,814 joules was recorded, and a skin state after the impact was observed to find that no debris was generated.

A PVC slush-molded skin sprayed with the two-component reactive aromatic polyurethane coating was connected to an instrument panel substrate by a foaming and weakening process to manufacture an instrument panel assembly; the instrument panel assembly was loaded onto an automobile to perform an airbag deployment test at −35 deg C.; there was no skin debris after the airbag deployment.

Low temperature performance of a PVC slush-molded skin can be effectively enhanced by a two-component reactive aromatic polyurethane coating, and the development requirement of the panel having such PVC slush-molded skin can be satisfied.

Example 4—Polyurea

A polyurea was sprayed on a non-appearance surface of a PVC slush-molded skin, and the PVC slush-molded skin with the polyurea coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 78,245 joules was recorded, and a skin state after the impact was observed to find that no debris was generated.

A PVC slush-molded skin sprayed with the polyurea coating was connected to an instrument panel substrate by a foaming and weakening process to manufacture an instrument panel assembly; the instrument panel assembly was loaded onto an automobile to perform an airbag deployment test at −35 deg C.; there was no skin debris after airbag deployment.

Example 5—Acrylic Elastomer

An acrylic elastomer was sprayed on a non-appearance surface of a PVC slush-molded skin, and the PVC slush-molded skin with the acrylic elastomer coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 78,245 joules was recorded, and a skin state after the impact was observed to find that no debris was generated.

A PVC slush-molded skin sprayed with the acrylic elastomer coating was connected to an instrument panel substrate by a foaming and weakening process to manufacture an instrument panel assembly; the instrument panel assembly was loaded onto an automobile to perform an airbag deployment test at −35 deg C.; there was no skin debris after the airbag deployment.

Example 6—Aromatic Thermoplastic Polyurethane (TPU)

An aromatic TPU was sprayed on a non-appearance surface of a PVC slush-molded skin, and the PVC slush-molded skin with the aromatic TPU coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 80,146 joules was recorded, and a skin state after the impact was observed to find that no debris was generated.

A PVC slush-molded skin sprayed with the aromatic TPU coating was connected to an instrument panel substrate by a foaming and weakening process to manufacture an instrument panel assembly; the instrument panel assembly was loaded onto an automobile to perform an airbag deployment test at −35 deg C.; there was no skin debris after the airbag deployment.

Example 7—Aliphatic Thermoplastic Polyurethane (TPU)

An aliphatic TPU was sprayed on a non-appearance surface of a PVC slush-molded skin, and the PVC slush-molded skin with the aliphatic TPU coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 81,358 joules was recorded, and a skin state after the impact was observed to find that no debris was generated.

A PVC slush-molded skin sprayed with the aliphatic TPU coating was connected to an instrument panel substrate by a foaming and weakening process to manufacture an instrument panel assembly; the instrument panel assembly was loaded onto an automobile to perform an airbag deployment test at −35 deg C.; there was no skin debris after the airbag deployment.

Example 8—Thermoplastic Polyolefin (TPO)

A TPO was sprayed on a non-appearance surface of a PVC slush-molded skin, and the PVC slush-molded skin with the TPO coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 80,124 joules was recorded, and a skin state after the impact was observed to find that no debris was generated.

A PVC slush-molded skin sprayed with the TPO coating was connected to an instrument panel substrate by a foaming and weakening process to manufacture an instrument panel assembly; the instrument panel assembly was loaded onto an automobile to perform an airbag deployment test at −35 deg C.; there was no skin debris after the airbag deployment.

Example 9—Solvent-Based Polyurethane

A solvent-based polyurethane was sprayed on a non-appearance surface of a PVC slush-molded skin, and the PVC slush-molded skin with the solvent-based polyurethane coating was subjected to a multi-axis impact test at −35 deg C., with an impact head weight of 11.81 kg, an impact ball diameter of 12.8 mm, and an impact speed of 2.2 m/s, to obtain an impact energy curve chart; an impact energy value of 57,618 joules was recorded, and a skin state after the impact was observed to find that debris was generated. A PVC slush-molded skin sprayed with the solvent-based polyurethane coating was connected to an instrument panel substrate by a foaming and weakening process to manufacture an instrument panel assembly; the instrument panel assembly was loaded onto an automobile to perform an airbag deployment test at −35 deg C.; and it was found that 1.3 g skins/debris separate towards the passenger compartment after the airbag deployment. Low-temperature performance of the PVC slush-molded skin was not effectively enhanced by the solvent-based polyurethane coating.

Examples/Summary

According an exemplary embodiment, a waterborne polyurethane, a two-component reactive aliphatic polyurethane, a two-component reactive aromatic polyurethane, a polyurea, an acrylic elastomer, an aromatic TPU, an aliphatic TPU and a TPO may effectively enhance low temperature performance of a PVC slush-molded skin, and meet a development requirement of a panel having such PVC slush-molded skin. Any number of combinations of waterborne polyurethane, two-component reactive aliphatic polyurethane, two-component reactive aromatic polyurethane, polyurea, acrylic elastomer, aromatic TPU, aliphatic TPU and TPO may also effectively enhance low temperature performance of a PVC slush-molded skin, and meet a development requirement of a panel having such PVC slush-molded skin.

According to an exemplary embodiment, a slush-molding powder for molding instrument panel skin layer 4 may comprise polyvinyl chloride (PVC), thermoplastic polyurethane (TPU), thermoplastic polyolefin (TPO), etc. The slush-molding powder may be used to manufacture products of complex shapes, while skin texture may be uniform, hand feeling may be soft and comfortable, internal stress of the skin may be small, thickness may be uniform, elasticity may be high and shrinking percentage may be low, mechanical performance may be suitable, and the ageing-resistant performance may be strong.

According to an exemplary embodiment, instrument panel skin layer 4 may be a PVC slush-molded skin.

According to an exemplary embodiment, reinforcing layer 3 may comprise waterborne polyurethane modified by a cellulose viscosifier.

Exemplary Embodiments

According to an exemplary embodiment, a panel for an automobile may comprise an instrument panel substrate layer (1), a foam layer (2), and an instrument panel skin layer (4) which are sequentially arranged, further comprising a reinforcing layer (3) on the instrument panel skin layer (4) and located between the foam layer (2) and the instrument panel skin layer (4), wherein the instrument panel skin layer (4) and the reinforcing layer (3) joined together further have a skin weakening line which extends through an entire thickness of the reinforcing layer and a part of thickness of the instrument panel skin layer. The panel may enhance low temperature airbag deployment performance, reducing risk of breakage and separation of the instrument panel skin layer and the foam.

An improved panel for a vehicle interior is provided for improved low temperature performance during airbag deployment.

According to an exemplary embodiment, the improved panel may comprise an instrument panel substrate layer, a foam layer, and an instrument panel skin layer. The panel may further comprise a reinforcing layer on the instrument panel skin layer and located between the foam layer and the instrument panel skin layer; the instrument panel skin layer and the reinforcing layer may further comprise a skin weakening line which runs through the thickness of the reinforcing layer and a part of thickness of the instrument panel skin layer.

The skin weakening line may be a weakening line obtained by weakening after the reinforcing layer and the instrument panel skin layer are joined together. The instrument panel substrate layer may comprise a polypropylene composite material. The foam layer may comprise polyurethane foam obtained by a reaction between isocyanate and polyether polyol. The reinforcing layer may comprise any one or combinations of waterborne polyurethane coating, two-component reactive aliphatic polyurethane, two-component reactive aromatic polyurethane, polyurea, acrylic elastomer, aromatic thermoplastic polyurethane (TPU), aliphatic TPU and thermoplastic polyolefin (TPO). The instrument panel skin layer may be molded with slush-molding powder selected from one of polyvinyl chloride, thermoplastic polyurethane, and thermoplastic polyolefin. The skin weakening line may further extend through thicknesses of the substrate layer and the foam layer. The skin weakening line may be obtained by weakening after the reinforcing layer, the instrument panel skin layer, the foam layer, and the substrate layer are joined. The reinforcing layer may be added between the skin layer and the foam layer, and the reinforcing layer and the skin may be joined together and then weakened, which may simplify manufacture of the trim/instrument panel and may reduce production cost. The reinforcing layer may be added between the skin layer and the foam layer, and the reinforcing layer and the skin may be joined together and then weakened; the breaking strength and the breaking elongation of the weakening line may be maintained, while the breaking strength and the breaking elongation of the skins around the weakening line are increased, which may enhance the low temperature blasting performance of the airbag, and may reduce the risk of breakage and fragmentation/separation of the instrument panel skin layer and the foam.

According to an exemplary embodiment as shown schematically in FIGS. 1 and 2, a trim component for a vehicle interior configured to provide an opening for deployment of an airbag from a chute through the opening may comprise a substrate 1; a cover 4/3 comprising a skin layer 4 and a support layer 3 coupled to skin layer 4; and a foam layer 2 between cover 4/3 and substrate 1. Support layer 3 may comprise at least one of (a) a polyurethane coating; (b) two-component reactive aliphatic polyurethane; (c) two-component reactive aromatic polyurethane; (d) polyurea; (e) acrylic elastomer; (f) aromatic thermoplastic polyurethane (TPU); (g) aliphatic thermoplastic polyurethane (TPU); (h) thermoplastic polyolefin (TPO). Support layer 3 may comprise a polyurethane coating. The polyurethane coating may be sprayed on skin layer 4. The polyurethane coating may comprise a waterborne polyurethane. Skin layer 4 may comprise a thickness; support layer 3 may comprise a thickness; the thickness of support layer 3 may be generally less than the thickness of skin layer 4. The trim component may comprise a first feature 6 and a second feature 5; first feature 6 and second feature 5 may be configured to facilitate deployment of the airbag through the opening by facilitating formation of the opening through foam layer 2, support layer 3 and skin layer 4; first feature 6 may comprise a notch in substrate 1; second feature 5 may comprise a notch in skin layer 4 and an aperture in support layer 3 aligned with the notch in skin layer 4. Foam layer 2 may be provided without a localized area of reduced thickness. Support layer 3 may be configured to at least partially limit deformation of skin layer 4 when force is applied to cover 4/3; deformation may comprise at least one of (a) stretching; (b) elongating. Skin layer 4 may be molded from at least one of (a) a slush-molding powder; (b) polyvinyl chloride; (c) thermoplastic polyurethane (TPU); (d) thermoplastic polyolefin (TPO).

According to an exemplary embodiment as shown schematically in FIGS. 1 and 2, a trim component for a vehicle interior configured to provide an opening for deployment of an airbag from a chute through the opening may be prepared by a process comprising the steps of: providing a skin layer 4; applying a support layer 3 to skin layer 4 to form a cover 4/3; providing a foam layer 2; providing a substrate 1; and assembling cover 4/3, foam layer 2 and substrate 1. Applying a support layer 3 to skin layer 4 may comprise spraying a polyurethane coating on skin layer 4. The process may further comprise the step of forming a feature 5 in the cover; feature 5 may comprise a notch in skin layer 4 and an aperture in support layer 3 aligned with the notch in skin layer 4. Support layer 3 may comprise at least one of (a) two-component reactive aliphatic polyurethane; (b) two-component reactive aromatic polyurethane; (c) polyurea; (d) acrylic elastomer; (e) aromatic thermoplastic polyurethane (TPU); (f) aliphatic thermoplastic polyurethane (TPU); (g) thermoplastic polyolefin (TPO). Providing a skin layer 4 may comprise slush molding a skin layer 4 from at least one of (a) a slush-molding powder; (b) polyvinyl chloride (PVC); (c) thermoplastic polyurethane (TPU); (d) thermoplastic polyolefin (TPO).

According to an exemplary embodiment as shown schematically in FIGS. 1 and 2, a process for producing a trim component for a vehicle interior configured to provide an opening for deployment of an airbag from a chute through the opening may comprise the steps of providing a skin layer; applying a support layer to the skin layer to form a cover; providing a foam layer; providing a substrate; and assembling the cover, the foam layer and the substrate. Applying a support layer to the skin layer may comprise spraying a polyurethane coating on the skin layer. The process may further comprise a step of forming a feature in the cover; the feature may comprise a notch in the skin layer and an aperture in the support layer aligned with the notch in the skin layer. The support layer may comprise at least one of (a) two-component reactive aliphatic polyurethane; (b) two-component reactive aromatic polyurethane; (c) polyurea; (d) acrylic elastomer; (e) aromatic thermoplastic polyurethane (TPU); (f) aliphatic thermoplastic polyurethane (TPU); (g) thermoplastic polyolefin (TPO). Providing a skin layer may comprise slush molding a skin layer from at least one of (a) a slush-molding powder; (b) polyvinyl chloride (PVC); (c) thermoplastic polyurethane (TPU); (d) thermoplastic polyolefin (TPO).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

What is claimed is:

1. A trim component for a vehicle interior configured to provide an opening for deployment of an airbag from a chute through the opening comprising:
   (a) a substrate;
   (b) a cover comprising a skin layer and a support layer coupled to the skin layer; and
   (c) a foam layer between the cover and the substrate;
   wherein the support layer comprises at least one of (a) a polyurethane coating; (b) two-component reactive aliphatic polyurethane; (c) two-component reactive aromatic polyurethane; (d) polyurea; (e) acrylic elastomer; (f) aromatic thermoplastic polyurethane (TPU); (g) aliphatic thermoplastic polyurethane (TPU); (h) thermoplastic polyolefin (TPO);
   wherein the skin layer comprises an inner surface coupled to the support layer;
   wherein the skin layer comprises a notch in the inner surface of the skin layer;
   wherein the support layer comprises a polyurethane coating;
   wherein the support layer comprises an aperture aligned with the notch in the skin layer;
   wherein the notch in the inner surface of the skin layer and the aperture in the support layer are configured to facilitate deployment of the airbag through the opening by facilitating formation of the opening through the support layer and the skin layer.

2. The trim component of claim 1 wherein the skin layer comprises an outer surface opposite the inner surface of the skin layer; wherein the outer surface comprises a substantially planar surface opposite the notch in the inner surface of the skin layer.

3. The trim component of claim 1 wherein the polyurethane coating is sprayed on the skin layer.

4. The trim component of claim 1 wherein the polyurethane coating comprises a waterborne polyurethane.

5. The trim component of claim 1 wherein the skin layer comprises a thickness; wherein the support layer comprises a thickness; wherein the thickness of the support layer is generally less than the thickness of the skin layer.

6. The trim component of claim 1 comprising a first feature and a second feature; wherein the first feature and the second feature are configured to facilitate deployment of the airbag through the opening by facilitating formation of the opening through the foam layer, the support layer and the skin layer; wherein the first feature comprises a notch in the substrate; wherein the second feature comprises the notch in the skin layer and the aperture in the support layer aligned with the notch in the skin layer.

7. The trim component of claim 1 wherein the notch comprises a localized area of reduced thickness at the inner surface of the skin layer; and wherein the foam layer is provided without a localized area of reduced thickness.

8. The trim component of claim 1 wherein the support layer is configured to at least partially limit deformation of the skin layer when force is applied to the cover; wherein deformation comprises at least one of (a) stretching; (b) elongating.

9. The trim component of claim 1 wherein the skin layer is molded from at least one of (a) a slush-molding powder; (b) polyvinyl chloride; (c) thermoplastic polyurethane (TPU); (d) thermoplastic polyolefin (TPO).

10. A trim component for a vehicle interior configured to provide an opening for deployment of an airbag from a chute through the opening prepared by a process comprising the steps of:
    (a) providing a skin layer comprising an inner surface and an outer surface;
    (b) applying a support layer to the inner surface of the skin layer to form a cover;
    (c) providing a foam layer;
    (d) providing a substrate;
    (e) assembling the cover, the foam layer and the substrate together; and
    (f) forming a feature in the cover;
    wherein the feature comprises a notch formed in the inner surface of the skin layer and an aperture in the support layer aligned with the notch formed in the inner surface of the skin layer.

11. The trim component of claim 10 wherein applying a support layer to the skin layer comprises spraying a polyurethane coating on the skin layer.

12. The trim component of claim 10 wherein the step of forming a feature in the cover comprises maintaining a generally continuous surface at the outer surface of the skin layer; and wherein the notch comprises a localized area of reduced thickness configured to form a weakening line in the inner surface of the skin layer.

13. The trim component of claim 10 wherein the support layer comprises at least one of (a) two-component reactive aliphatic polyurethane; (b) two-component reactive aromatic polyurethane; (c) polyurea; (d) acrylic elastomer; (e)

aromatic thermoplastic polyurethane (TPU); (f) aliphatic thermoplastic polyurethane (TPU); (g) thermoplastic polyolefin (TPO).

14. The trim component of claim 10 wherein providing a skin layer comprises slush molding a skin layer from at least one of (a) a slush-molding powder; (b) polyvinyl chloride (PVC); (c) thermoplastic polyurethane (TPU); (d) thermoplastic polyolefin (TPO).

15. A process for producing a trim component for a vehicle interior configured to provide an opening for deployment of an airbag from a chute through the opening comprising the steps of:
  (a) providing a skin layer comprising an inner surface and an outer surface;
  (b) applying a support layer to the inner surface of the skin layer to form a cover;
  (c) providing a foam layer;
  (e) providing a substrate;
  (f) assembling the cover, the foam layer and the substrate together; and
  (g) forming a feature in the cover;
  wherein the feature comprises a localized area of reduced thickness comprising a weakening line formed in the inner surface of the skin layer and an aperture in the support layer aligned with the weakening line formed in the inner surface of the skin layer.

16. The process of claim 15 wherein the step of applying a support layer to the skin layer comprises spraying a polyurethane coating on the skin layer.

17. The process of claim 15 wherein the step of forming a feature in the cover comprises maintaining a generally continuous surface at the outer surface of the skin layer.

18. The process of claim 15 wherein the support layer comprises at least one of (a) two-component reactive aliphatic polyurethane; (b) two-component reactive aromatic polyurethane; (c) polyurea; (d) acrylic elastomer; (e) aromatic thermoplastic polyurethane (TPU); (f) aliphatic thermoplastic polyurethane (TPU); (g) thermoplastic polyolefin (TPO).

19. The process of claim 15 wherein providing a skin layer comprises slush molding a skin layer from at least one of (a) a slush-molding powder; (b) polyvinyl chloride (PVC); (c) thermoplastic polyurethane; (d) thermoplastic polyolefin (TPO).

20. The process of claim 15 wherein the foam layer comprises a foam material between the skin layer and the substrate; wherein the weakening line comprises a notch adjacent to the foam material.

* * * * *